Feb. 12, 1924. 1,483,703
F. WEVER
APPARATUS FOR MAKING FEATHER LINED FABRICS
Filed Oct. 24, 1918    2 Sheets-Sheet 1
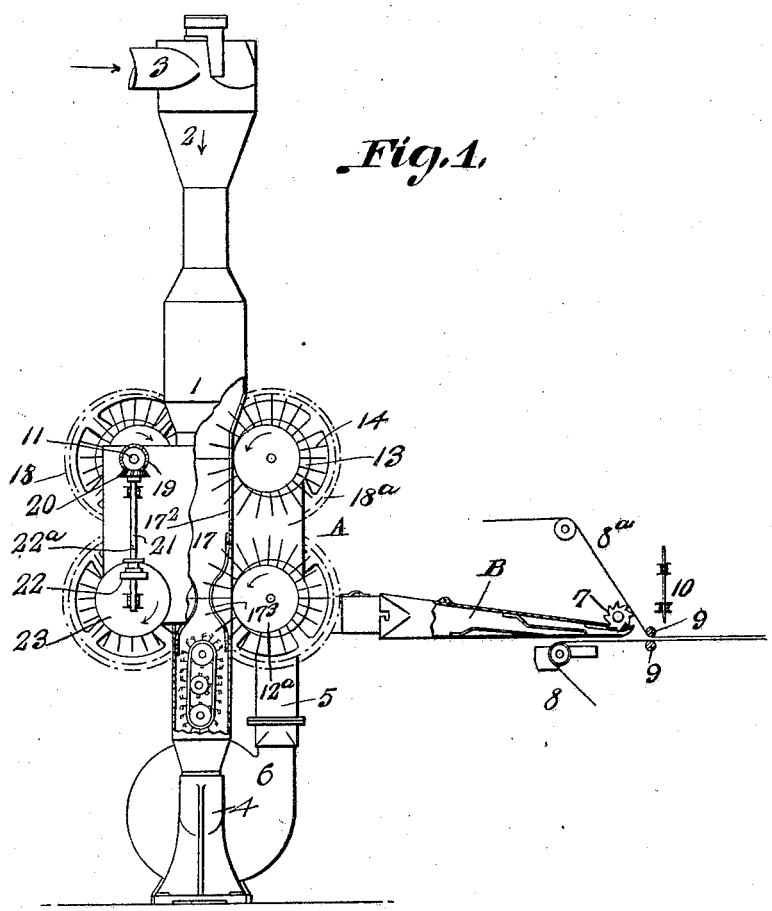

Feb. 12, 1924. 1,483,703
F. WEVER
APPARATUS FOR MAKING FEATHER LINED FABRICS
Filed Oct. 24, 1918 2 Sheets-Sheet 2
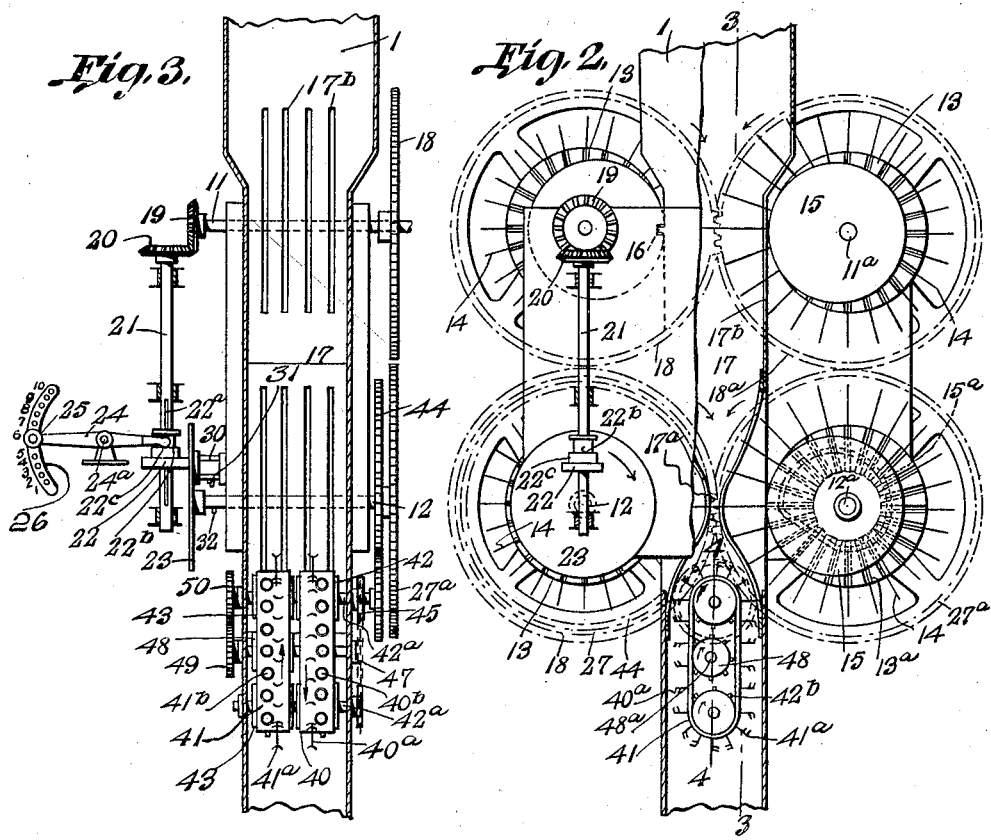
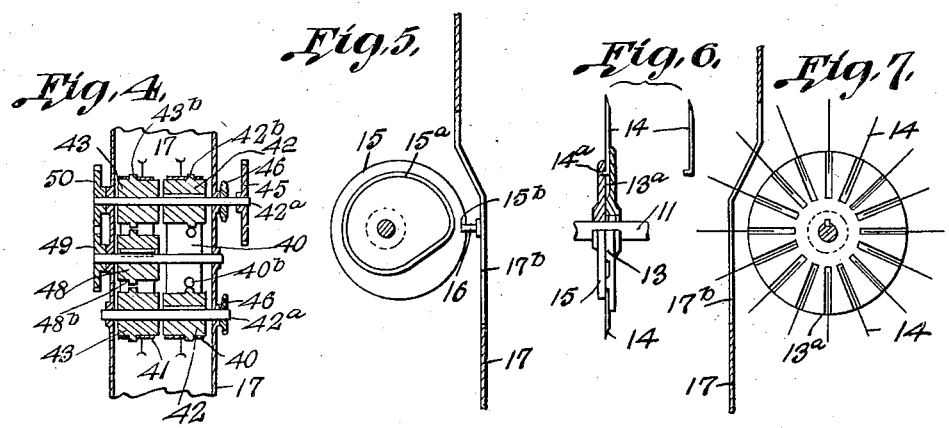
Inventor:
Fritz Wever
By Sturtevant & Mason
Attorneys Patented Feb. 12, 1924.

1,483,703

UNITED STATES PATENT OFFICE.

FRITZ WEVER, OF STUTTGART, GERMANY.

APPARATUS FOR MAKING FEATHER-LINED FABRICS.

Application filed October 24, 1918. Serial No. 259,561.

*To all whom it may concern:*

Be it known that I, FRITZ WEVER, residing at Stuttgart, in the Kingdom of Wurttemberg, Germany, have invented certain new and useful Improvements in Apparatus for Making Feather-Lined Fabrics, of which the following is a specification.

The present invention relates to machines for manufacturing fabrics composed of a layer or layers of woven or other sheet fabric in combination with a layer or layers of feathers superposed on such sheet fabric or interposed between several layers of same. In particular it relates to the mechanism for distributing and loosening the mass of feathers as they are fed forward to the mechanism for securing the feathers to the supporting fabric and as such it constitutes an improvement on the apparatus set forth and claimed in my application for Letters Patent of the United States executed concurrently herewith (Patent No. 1,392,287).

The object of my present invention is to provide means for accurately determining the thickness and density of the layer of feathers fed forward, to regulate and adjust at will the amount of material delivered and to register the same. With this object in view an apparatus embodying my invention comprises two groups of feeding and distributing devices arranged in succession below the feather collecting receptacle the rate of feed of which may be varied separately and relatively to one another, so that an accumulation of feathers to any desired extent may be effected between the two groups. In this manner the second group of feeding devices will withdraw from the mass of feathers between the two groups uniform quantities of feathers in a layer of uniform density and thickness and the quantity of material fed will be accurately measured by the speed of the said second group.

My invention also comprises such further means, devices and combinations of parts as will be set forth hereinafter and pointed out in the claims.

In the accompanying drawing I have illustrated an embodiment of my invention in its preferred form.

In this drawing—

Figure 1 represents, in sectional elevation, a machine for making feather-lined fabrics provided with the improved distributing and loosening device;

Figure 2 a vertical section of the distributing and loosening device on an enlarged scale;

Figure 3 a vertical section at right angles thereto on line 3—3 Figure 2;

Figure 4 a detail view, being a section on line 4—4, Figure 2;

Figures 5, 6 and 7 further detail views.

The feather distributing and loosening mechanism is represented at A in Figure 1, where it is represented as occupying a position below the feather receptacle 1, forming part of the feather casing 17, which receives the feathers from the hopper 2 to which they are conveyed through a pipe 3 by any suitable means. In the distributing device the feathers, after having been thoroughly segregated and loosened, reach the lower part 4 of the distributing casing 17 whence they are swept forward to the feather spreader B through conduit 5 by means of a blower or suction pump 6. The spreader serves to arrange the feathers in an evenly distributed layer as they are fed forward by the blast from the blower. At its exit portion it is provided with a stop-device consisting of a series of toothed disks 7 arranged to rotate intermittently, one tooth at a time, to release a portion of the feather-layer at each impulse and to deliver it between the sheet fabrics 8 and $8^a$ and into the bite of the feed rollers 9, 9 which carry the two fabrics with interposed feather-layer to sewing or other connecting mechanism 10.

The parts so far described have been fully set forth and claimed in my aforesaid concurrent application. My present invention resides in the new distributing and featherloosening device A shown in Figure 1 and more in detail and enlarged in Figures 2 and 3.

Referring to said figures, it will be observed that the distributing and loosening mechanism comprises two horizontal pairs of shafts 11, $11^a$ and 12, $12^a$, respectively, arranged outside the feather casing 17 and one below the other, upon each of which shafts is keyed a drum consisting of a series of disks 13, each provided with a number of radial grooves $13^a$ of rectangular cross-section, best shown in Figures 2, 6 and 7, said grooves serving as guides for the flat picker needles 14 adapted to reciprocate in said grooves. As best shown in Figure 6, these pickerneedles are formed at their base with a toe or projection $14^a$ adapted to engage a cam-groove 15ª (Figures 5 and 6) of cam disk 15. One of these cam-disks 15 is arranged opposite each needle disk 13, as shown in Figures 3 and 6, and said disks are secured against rotation with the shafts 11, 11ª, 12 and 12ª by a pin 16 extending from the casing 17 and engaging a notch or recess 15ᵇ on the periphery of each disk, as shown in detail in Figure 5 and indicated in dotted lines in Figure 2.

The picker-needles 14 are of such a length that, as they pass opposite the casing 17 they each penetrate to the middle of the same, said casing being for this purpose provided with a series of vertical slots 17ᵇ as shown in Figures 1, 2, 3, 5 and 7. The cam grooves are so designed that as the needles approach the casing 17 they are gradually thrust forward, reaching their most eccentric position when lying horizontally in front of the casing, and are somewhat more abruptly withdrawn toward the center of the disks as they continue their rotation. This is indicated in Figure 5 and, in dotted lines, in Figure 2. As shown in Figures 1 and 2, the casing 17 is formed with a contracted portion or throat 17ª at a point opposite the lower set of picker-needle drums, said throat being also provided with longitudinal slots for the passage of the picker-needles.

The picker-needle disks 13 are rotated inwardly and downwardly as indicated by the arrows in Figure 2 by the following mechanism:

On the shafts 11 and 11ª outside the casing 17 are keyed the gear-wheels 18 and 18ª respectively said gear-wheels intermeshing as shown, so that the gear wheel 18ª whose shaft 11ª receives its motion from any suitable source of power serves to drive the gear-wheel 18. At the end of the shaft 11 outside casing 17 is keyed a bevel gear 19 meshing with bevel gear 20 keyed on vertical shaft 21. On shaft 21 is slidably mounted the friction roller 22, said friction roller being secured against rotation with respect to the shaft by a spline or feather 22ª, so that the same is forced to rotate with the shaft 21 but enabled to slide longitudinally thereon. The friction-roller 22 bears against a friction disk 23 keyed to the lower shaft 12 carrying one set of the picker needle disks. An adjusting lever 24 fulcrumed at 24ª engages with its extremity an annular groove 22ᵇ in the collar 22ᶜ of the friction roller 22. By moving said lever upward or downward, the point of contact between the friction roller 22 and friction disk 23 is shifted radially toward or from the center of said disk, whereby the rate of rotation of said disk and, with it, of the lower picker-needle disk can be adjusted at will. The shifting lever 24 is secured in any one of its positions of adjustment by a detent 25 adapted to engage one of the recesses in the sector 26. Intermeshing gear-wheels 27 and 27ª are keyed to the lower shafts 12 and 12ª, respectively said gear-wheels intermeshing to the gear-wheels 18, 18ª. Thereby the said lower shafts and picker-needle disks are caused to rotate in the same direction, respectively, as the upper pair and as indicated by the arrows in Figures 1 and 2.

According as the friction roller 22 bears against the friction disk 23 at a point more or less removed from its center the relative speed of the lower picker-needle disks with respect to that of the upper disks diminishes or increases, and thus the amount of feathers accumulating in the space of casing 17 between the upper and lower drums or sets of disks 13 can be regulated to a nicety by raising or lowering the lever 24 and locking it in the desired position by causing the detent 25 to engage the corresponding recess on sector 26. Since the amount of feathers delivered by the lower picker-needles per second or time-unit is governed by the extent to which the feathers accumulate in the space between the drums, the rate of such delivery per second or time-unit may be indicated by a proper scale on said sector as shown in Figure 3.

The number of revolutions of the lower drums or picker-needle disks at any given time may be indicated by a recorder 30 of any known or desired construction, the actuating dog 31 of which lies in the path of a striker or projection 32 on shaft 12 which thus, at each revolution, actuates the dog to advance the unit-disk of the recorder one step. It is evident that the disks of the recorder may be so arranged and marked that the quantity of feathers of a given density and for any given period of time may be read off in units of volume.

For positively conveying the feathers from the lower pair of picker-needle disks 13 to the lower portion 4 of the casing 17 there is provided below said disks and within the casing a pair of carrier belts 40 and 41 arranged to travel in opposite directions as indicated by the arrows in Figures 2 and 3, and each provided at suitable intervals apart with gripping pins 40ª and 41ª, respectively. These carrier belts are actuated as follows: By reference to Figures 2, 3 and particularly Figure 4 it will be seen that the belt 40 runs over a pair of rollers 42, 42 keyed to arbors 42ª, 42ª and the belt 41 similarly passes over rollers 43, 43, loosely mounted on said arbors, the said rollers 42 and 43 being provided at intervals on their peripheries with studs 42ᵇ, 43ᵇ, respectively, engaging perforations 40ᵇ, 41ᵇ on the belts to prevent slip. On the shaft 12 is keyed a second gear wheel 44 which meshes with gear wheel 45 keyed to the upper arbor 42ª thereby rotating the said arbor. The arbors 42ª are, moreover, each provided with a sprocket wheel 46, keyed thereto, a chain 47 running over said sprocket wheels, serving to communicate the movement from the upper to the lower arbor, to cause the belt 40 to travel in the direction of the arrow in Figure 3. The belt 41 is caused to travel in the opposite direction by the intervention of an intermediate roller 48, formed, like the rollers 42 and 43, with studs 48$^b$ engaging the perforations on belt 41, keyed to intermediate arbor 48$^a$ and having secured at its extremity a pinion 49 meshing with a pinion 50 secured to the extremity of arbor 42$^a$. The studs 42$^b$ and 48$^b$ engaging with the perforations on the belts are in many cases sufficient to effect the positive feed of the said belts, but I prefer to reinforce this action by the sprocket wheels 46 and chain 47.

In operation the feather-material is first stripped from the feather-receptacle at 1 by the picker needles 14 of the upper pair of disks 13 into the space of the casing between the upper and lower pair of disks. There the mass of feathers is more or less compacted according as the ratio of the speed of the lower picker-needle disks to that of the upper disks is less or greater, which ratio may be adjusted as desired by lowering or raising the lever 24. By the combined action of the lower picker-needle drums and the contracted portion 17$^a$ of the casing a sheet of feather-material of greater or less density will thus be delivered by the lower picker-needle disks. The mass of feathers thus delivered is then received by the gripping pins 40$^a$ and 42$^a$ on the belts 40, 41 and portions of the same are then carried alternately to opposite sides of the casing and toward the lower portion 4 of the casing, whence the feathers are transferred to the spreading devices B, by the blower 6 through conduit 5. Thereby an even delivery of the mass of feathers of uniform density is secured.

I claim as my invention—

1. In an apparatus of the character set forth, the combination of a casing for the material to be treated with a pair of material-advancing devices, both arranged to move in the same direction and to act on the material in the casing, said advancing devices being arranged one behind the other with respect to the line of feed and spaced apart, and means for varying the speeds of the said advancing devices relatively to one another, to regulate the amount of accumulation of material between the advancing devices.

2. In an apparatus of the character set forth, a casing for the material to be treated in combination with a pair of feed drums being spaced apart and arranged one in advance of the other and formed with means for engaging the material in the casing, means for causing the feed-drums to rotate in the same direction, and means for varying the speed of the said feed drums relatively to one another, whereby the amount of accumulation of material between the feed-drums may be regulated.

3. In an apparatus of the character set forth, a receptacle for the material under treatment and a feed-casing extending below the same in combination with a pair of rotary drums provided with picker-needles, arranged to enter the casing, a second pair of rotary drums also provided with picker needles, arranged to enter the casing, the drums of each pair being arranged respectively at opposite sides of the casing.

4. In an apparatus of the character set forth, a rotary drum for feeding and separating the material treated, said drum consisting of an aligned series of radially grooved rotary disks in combination with a series of stationary disks interposed between the rotary disks and formed with cam-grooves facing the radial grooves of the rotary disks, picker-needles being arranged in the radial grooves of the rotary disks, said needles being provided with projections engaging the cam-grooves.

5. In an apparatus of the character set forth, a conduit casing for the passage of the material treated, in combination with a pair of rotary drums, one arranged on each side of the casing and each provided with picker-needles arranged to be thrust forward during the first part of their travel within the casing and to recede during the last part of their travel in the casing and as they leave the casing.

6. In a feather-distributing and feeding apparatus, the combination, with a feather casing, of a rotary disk provided with radial grooves arranged at the side of the casing, picker needles occupying said grooves, a stationary disk adjoining said rotary disk and provided with a cam, the picker needles engaging said cam.

7. In a feather-distributing and feeding apparatus, the combination, with a feather-casing, of a pair of rotary drums arranged one on each side of the casing, each drum consisting of a group of radially grooved rotary disks with interposed stationary disks having cam grooves facing the radial grooves of the rotary disks, picker-needles being arranged in the radial grooves of the rotary disks, said needles being provided with projections engaging the cam grooves.

8. In a feather-distributing and feeding apparatus, a feather receptacle and a feather casing below the same formed with a contracted portion or throat, in combination with a pair of rotary drums provided with picker-needles, one drum arranged at each side of the casing, said casing being provided at this point with longitudinal slots, for the passage of the needles, and a second pair of needles carrying drums below the first pair, one drum arranged in each side of the contracted portion of the casing, said contracted portion being provided with similar longitudinal slots for the passage of the needles, whereby the mass of feathers is delivered in the form of a loose sheet.

9. In a feather distributing and feeding apparatus, a feather casing and two pairs of drums carrying picker-needles extending therefrom, arranged at the sides of the casing, the drums of each pair being geared together, in combination with a variable transmission gear connecting the two pairs of drums whereby the ratio between the speeds of the upper and lower pair of drums may be adjusted.

10. In a feather distributing and feeding apparatus a feather-casing and two pairs of drums mounted on rotary shafts and carrying picker-needles extending from the same arranged in series, a drum of each pair being arranged on each side of the casing, intermeshing gear-wheels mounted on the upper pair of shafts and a similar pair of intermeshing gear-wheels mounted on the lower shafts, in combination with a friction disk mounted on one of the lower shafts, a friction wheel bearing against the friction disk and slidably mounted on a rotary shaft, gearing between the said rotary shaft and one of the upper drum shafts and an adjusting lever for shifting the said friction wheel on the rotary shaft.

11. In a feather-distributing and feeding apparatus, a feather-receptacle and casing in combination with a pair of feather advancing devices arranged in series, means for varying the relative speed of said feather advancing devices to regulate the amount of accumulation of material between advancing devices, a pair of conveyers provided with gripper-pins arranged at the delivery point of the second advancing device and means for moving said conveyers in opposite directions with respect to each other.

12. In a feather distributing and feeding apparatus a feather casing having longitudinal slots and a pair of rotary drums arranged at the sides of the casing and provided with picker-needles adapted to enter the slots as they pass the casing in combination with a pair of belts provided with gripping pins arranged to travel in mutually opposite directions and arranged below the delivery point of the rotary drums.

13. In a feather distributing and feeding apparatus, a pair of feather-advancing drums provided with a series of radial picker-needles, means for rotating said drums in opposite directions, means for thrusting said needles on the portions of the drums approaching each other forward and for withdrawing said needles on the portions receding from each other, in combination with a pair of traveling belts provided with gripper-pins moving in mutually opposite directions and arranged below the delivery point of the drums.

14. In a feather distributing and feeding apparatus, a feather receptacle and a feather casing below the same formed with a contracted portion or throat, in combination with a pair of rotary drums provided with picker-needles, one drum arranged at each side of the casing said casing being provided with openings for the passage of the needles, a second pair of needle-carrying drums below the first pair, one drum arranged on each side of the throat, said throat being provided with openings for the passage of the needles, and a pair of belts arranged to travel in mutually opposite directions, provided with gripper pins and located below the delivery point of the second pair of drums.

In testimony whereof I affix my signature in presence of two witnesses.

FRITZ WEVER.

Witnesses:
JOHANNA HAUG,
EMILIE DRYLE.